United States Patent
Du et al.

(10) Patent No.: US 8,363,306 B2
(45) Date of Patent: Jan. 29, 2013

(54) PIGMENT PARTICLES FOR ELECTROPHORETIC DISPLAY

(75) Inventors: Hui Du, Milpitas, CA (US); Xiaojia Wang, Fremont, CA (US); HongMei Zang, Sunnyvale, CA (US); Haiyan Gu, Fremont, CA (US)

(73) Assignee: SiPix Imaging, Inc., Fremont, CA (US)

( * ) Notice: Subject to any disclaimer, the term of this patent is extended or adjusted under 35 U.S.C. 154(b) by 127 days.

(21) Appl. No.: 13/079,607

(22) Filed: Apr. 4, 2011

(65) Prior Publication Data

US 2011/0242641 A1 Oct. 6, 2011

Related U.S. Application Data

(60) Provisional application No. 61/321,017, filed on Apr. 5, 2010.

(51) Int. Cl.
  *G02B 26/00* (2006.01)
  *B05D 1/36* (2006.01)
  *G03G 17/04* (2006.01)
(52) U.S. Cl. .................. 359/296; 427/407.1; 430/32
(58) Field of Classification Search .............. 359/296; 427/407.1; 430/32
See application file for complete search history.

(56) References Cited

U.S. PATENT DOCUMENTS

| | | | |
|---|---|---|---|
| 5,914,806 A | 6/1999 | Gordon, II et al. | |
| 6,577,433 B1 | 6/2003 | Lin et al. | |
| 6,930,818 B1 | 8/2005 | Liang et al. | |
| 7,052,766 B2 | 5/2006 | Zang et al. | |
| 7,110,162 B2 | 9/2006 | Wu et al. | |
| 7,286,279 B2 | 10/2007 | Yu et al. | |
| 7,382,514 B2 | 6/2008 | Hsu et al. | |
| 7,821,702 B2 | 10/2010 | Liang et al. | |
| 2006/0056009 A1 | 3/2006 | Kornbrekke et al. | |
| 2006/0127667 A1 | 6/2006 | Zang et al. | |
| 2009/0009852 A1 | 1/2009 | Honeyman et al. | |
| 2012/0199798 A1* | 8/2012 | Du et al. ............ | 252/519.5 |

FOREIGN PATENT DOCUMENTS

WO   WO 01/67170   9/2001

OTHER PUBLICATIONS

International Search Report dated Jun. 1, 2011, PCT/US2011/31294.
Allen, K. (Oct. 2003), Electrophoretics Fulfilled. *Emerging Displays Review: Emerging Display Technologies, Monthly Report*—Oct. 2003, 9-14.
Bardsley, J.N. & Pinnel, M.R. (Nov. 2004) Microcup™ Electrophoretic Displays. *USDC Flexible Display Report*, 3.1.2. pp. 3-12-3-16.
Chaug, Y.S., Haubrich, J.E., Sereda, M. and Liang, R.C. (Apr. 2004). Roll-to-Roll Processes for the Manufacturing of Patterned Conductive Electrodes on Flexible Substrates. *Mat. Res. Soc. Symp. Proc.*, vol. 814, I9.6.1.
Chen, S.M. (Jul. 2003) The Applications for the Revolutionary Electronic Paper Technology. *OPTO News & Letters*, 102, 37-41. (in Chinese, English abstract attached).
Chen, S.M. (May 2003) The New Application and the Dynamics of Companies. *TRI*. 1-10. (in Chinese, English abstract attached).
Chung, J., Hou, J., Wang, W., Chu, L.Y., Yao, W., & Liang, R.C. (Dec. 2003) Microcup® Electrophoretic Displays, Grayscale and Color Rendition. *IDW*, AMD2/EP1-2, 243-246.

(Continued)

*Primary Examiner* — David N Spector
(74) *Attorney, Agent, or Firm* — Perkins Coie LLP.

(57) ABSTRACT

The present invention is directed to an electrophoretic display fluid, in particular, pigment particles dispersed in a solvent or solvent mixture, and methods for their preparation. The pigment particles generated, according to the present invention, are stable in solvent under an electric field, have desired charge and charge density on the particle surface.

31 Claims, 7 Drawing Sheets

OTHER PUBLICATIONS

Ho, Andrew. (Nov. 2006) *Embedding e-Paper in Smart Cards, Pricing Labels & Indicators*. Presentation conducted at Smart Paper Conference Nov. 15-16, 2006, Atlanta, GA, USA.

Ho, C., & Liang, R.C. (Dec. 2003) *Microcup® Electronic Paper by Roll-to-Roll Manufacturing Processes*. Presentation conducted at FEG, Nei-Li, Taiwan.

Ho, Candice. (Feb. 1, 2005) *Microcup® Electronic Paper Device and Application*. Presentation conducted at USDC 4th Annual Flexible Display Conference 2005.

Hou, J., Chen, Y., Li, Y., Weng, X., Li, H. and Pereira, C. (May 2004). Reliability and Performance of Flexible Electrophoretic Displays by Roll-to-Roll Manufacturing Processes. *SID Digest*, 32.3, 1066-1069.

Lee, H., & Liang, R.C. (Jun. 2003) SiPix Microcup® Electronic Paper—An Introduction. *Advanced Display*, Issue 37, 4-9 (in Chinese, English abstract attached).

Liang, R.C. (Feb. 2003) *Microcup® Electrophoretic and Liquid Crystal Displays by Roll-to-Roll Manufacturing Processes*. Presentation conducted at the Flexible Microelectronics & Displays Conference of U.S. Display Consortium, Phoenix, Arizona, USA.

Liang, R.C. (Apr. 2004) *Microcup Electronic Paper by Roll-to-Roll Manufacturing Process*. Presentation at the Flexible Displays & Electronics 2004 of Intertech, San Fransisco, California, USA.

Liang, R.C. (Oct. 2004) *Flexible and Roll-able Displays/Electronic Paper—A Technology Overview*. Paper presented at the METS 2004 Conference in Taipie, Taiwan.

Liang, R.C., & Tseng, S. (Feb. 2003). *Microcup® LCD, A New Type of Dispersed LCD by a Roll-to-Roll Manufacturing Process*. Paper presented at the IDMC, Taipei, Taiwan.

Liang, R.C., (Feb. 2005) *Flexible and Roll-able Displays/Electronic Paper—A Brief Technology Overview*. Flexible Display Forum, 2005, Taiwan.

Liang, R.C., Hou, J., & Zang, H.M. (Dec. 2002) Microcup Electrophoretic Displays by Roll-to-Roll Manufacturing Processes. *IDW*, EP2-2, 1337-1340.

Liang, R.C., Hou, J., Chung, J., Wang, X., Pereira, C., & Chen, Y. (May 2003) Microcup® Active and Passive Matrix Electrophoretic Displays by a Roll-to-Roll Manufacturing Processes. *SID Digest*, vol. 34, Issue 1, pp. 838-841, 20.1.

Liang, R.C., Hou, J., Zang, H.M., & Chung, J. (Feb. 2003). *Passive Matrix Microcup® Electrophoretic Displays*, Paper presented et the IDMC, Taipei, Taiwan.

Liang, R.C., Hou, J., Zang, H.M., Chung, J., & Tseng, S. (Feb. 2003). Microcup® Displays: Electronic Paper by Roll-to-Roll Manufacturing Processes. *Journal of the SID*, 11(4), 621-628.

Liang, R.C., Zang, H.M., Wang, X., Chung, J. & Lee, H., (Jun./Jul. 2004) << Format Flexible Microcup® Electronic Paper by Roll-to-Roll Manufacturing Process >>, Presentation conducted at the 14th FPD Manufacturing Technology Expo & Conference.

Nikkei Microdevices. (Dec. 2002) Newly-Developed Color Electronic Paper Promises—Unbeatable Production Efficiency. *Nikkei Microdevices*, p. 3. (in Japanese with English translation).

Sprague, R.A. (Sep. 23, 2009) SiPix Microcup Electrophoretic Epaper for Ebooks, *NIP 25*, 2009 pp. 460-462. (Presentation conducted on Sep. 23, 2009 at the 25th Int'l Conference on Digital Printing Technologies, Digital Fabrication 2009 (NIP 25) by Society for Imaging Science and Technology, in Louisville, Kentucky, USA. ).

Wang, X., Kiluk, S., Chang, C., & Liang, R.C. (Feb. 2004). Microcup® Electronic Paper and the Converting Processes. *ASID*, 10.1.2-26, 396-399, Nanjing, China.

Wang, X., Kiluk, S., Chang, C., & Liang R.C., (Jun. 2004) Microcup® Electronic Paper and the Converting Processes. *Advanced Display*, Issue 43, 48-51 (in Chinese, with English abstract).

Wang, X., Li, P., Sodhi, D., Xu, T. and Bruner, S. et al., (Feb. 2006) *Inkjet Fabrication of Multi-Color Microcup® Electrophorectic Display*. The Fiexible Microelectronic & Displays Conference of U.S. Display Consortium.

Wang, X., Zang, H.M., and Li, P. (Jun. 2006) Roll-to-Roll Manufacturing Process for Full Color Electrophoretic film. *SID Digest*, 00pp. 1587-1589.

Zang, H.M, Hwang, J.J., Gu, H., Hou, J., Weng, X., Chen, Y., et al., (Jan. 2004). Threshold and Grayscale Stability of Microcup® Electronic Paper. *Proceeding of SPIE-IS&T Electronic Imaging, SPIE* vol. 5289, 102-108.

Zang, H.M., & Hou, Jack, (Feb. 2005) *Flexible Microcup® EPD by RTR Process*. Presentation conducted at $2^{nd}$ Annual Paper-Like Displays Conference, Feb. 9-11, 2005, St. Pete Beach, Florida.

Zang, H.M. (Oct. 2003). *Microcup® Electronic Paper by Roll-to-Roll Manufacturing Processes*. Presentation conducted at the Advisory Board Meeting, Bowling Green State University, Ohio, USA.

Zang, H.M. (Feb. 2004). *Microcup Electronic Paper*. Presentation conducted at the Displays & Microelectronics Conference of U.S. Display Consortium, Phoenix, Arizona, USA.

Zang, H.M. (Sep. 2006) *Monochrome and Area Color Microcup® EPDs by Roll-to-Roll Manufacturing Process*. Presentation conducted at the Fourth Organic Electronics Conference and Exhibition (OEC-06), Sep. 25-27, 2006, Frankfurt, Germany.

Zang, H.M. (Feb. 2007) *Developments in Microcup® Flexible Displays*. Presentation conducted at the 6th Annual Flexible Display and Microelectronics Conference, Phoenix, AZ Feb. 6-8.

Zang, H.M., & Liang, R.C. (2003) Microcup Electronic Paper by Roll-to-Roll Manufacturing Processes. *The Spectrum*, 16(2), 16-21.

Zang, H.M., Wang, F., Kang, Y.M., Chen, Y. and Lin, W. (Jul. 2007) *Microcup® e-Paper for Embedded and Flexible Designs*. IDMC'07, Taipei International Convention Center, Taiwan.

Zang, H.M., Wang, W., Sun, C., Gu, H., and Chen, Y. (May 2006) Monochrome and Area Color Microcup® EPDs by Roll-to-Roll Manufacturing Processes. *ICIS' 06 International Congress of Imaging Science Final Program and Proveedings*, pp. 362-365.

Int'l Preliminary Report on Patentability, PCT/US2011/031294, mailed Oct. 18, 2012.

* cited by examiner

PIGMENT PARTICLES FOR ELECTROPHORETIC DISPLAY

This application claims the benefit of U.S. Provisional Application No. 61/321,017, filed Apr. 5, 2010; the content of which is incorporated herein by reference in its entirety.

FIELD OF THE INVENTION

The present invention is directed to pigment particles, an electrophoretic display fluid and an electrophoretic display utilizing such an electrophoretic fluid, and methods for their preparation.

BACKGROUND OF THE INVENTION

An electrophoretic display (EPD) is a non-emissive device based on the electrophoresis phenomenon influencing charged pigment particles suspended in a dielectric solvent. An EPD typically comprises a pair of spaced-apart plate-like electrodes. At least one of the electrode plates, typically on the viewing side, is transparent. An electrophoretic fluid composed of a dielectric solvent with charged pigment particles dispersed therein is enclosed between the two electrode plates.

An electrophoretic fluid may have one type of charged pigment particles dispersed in a solvent or solvent mixture of a contrasting color. In this case, when a voltage difference is imposed between the two electrode plates, the pigment particles migrate by attraction to the plate of polarity opposite that of the pigment particles. Thus, the color showing at the transparent plate can be either the color of the solvent or the color of the pigment particles. Reversal of plate polarity will cause the particles to migrate back to the opposite plate, thereby reversing the color.

Alternatively, an electrophoretic fluid may have two types of pigment particles of contrasting colors and carrying opposite charges and the two types of pigment particles are dispersed in a clear solvent or solvent mixture. In this case, when a voltage difference is imposed between the two electrode plates, the two types of pigment particles would move to opposite ends (top or bottom) in a display cell. Thus one of the colors of the two types of pigment particles would be seen at the viewing side of the display cell.

For all types of the electrophoretic displays, the fluid contained within the individual display cells of the display is undoubtedly one of the most crucial parts of the device. The composition of the fluid determines, to a large extent, the lifetime, contrast ratio, switching rate and bistability of the device.

In an ideal dispersion, the charged pigment particles remain separate and do not agglomerate or stick to each other or to the electrodes, under all operating conditions. In addition, all components in the fluid must be chemically stable and compatible with the other materials present in an electrophoretic display.

SUMMARY OF THE INVENTION

Figure 1:
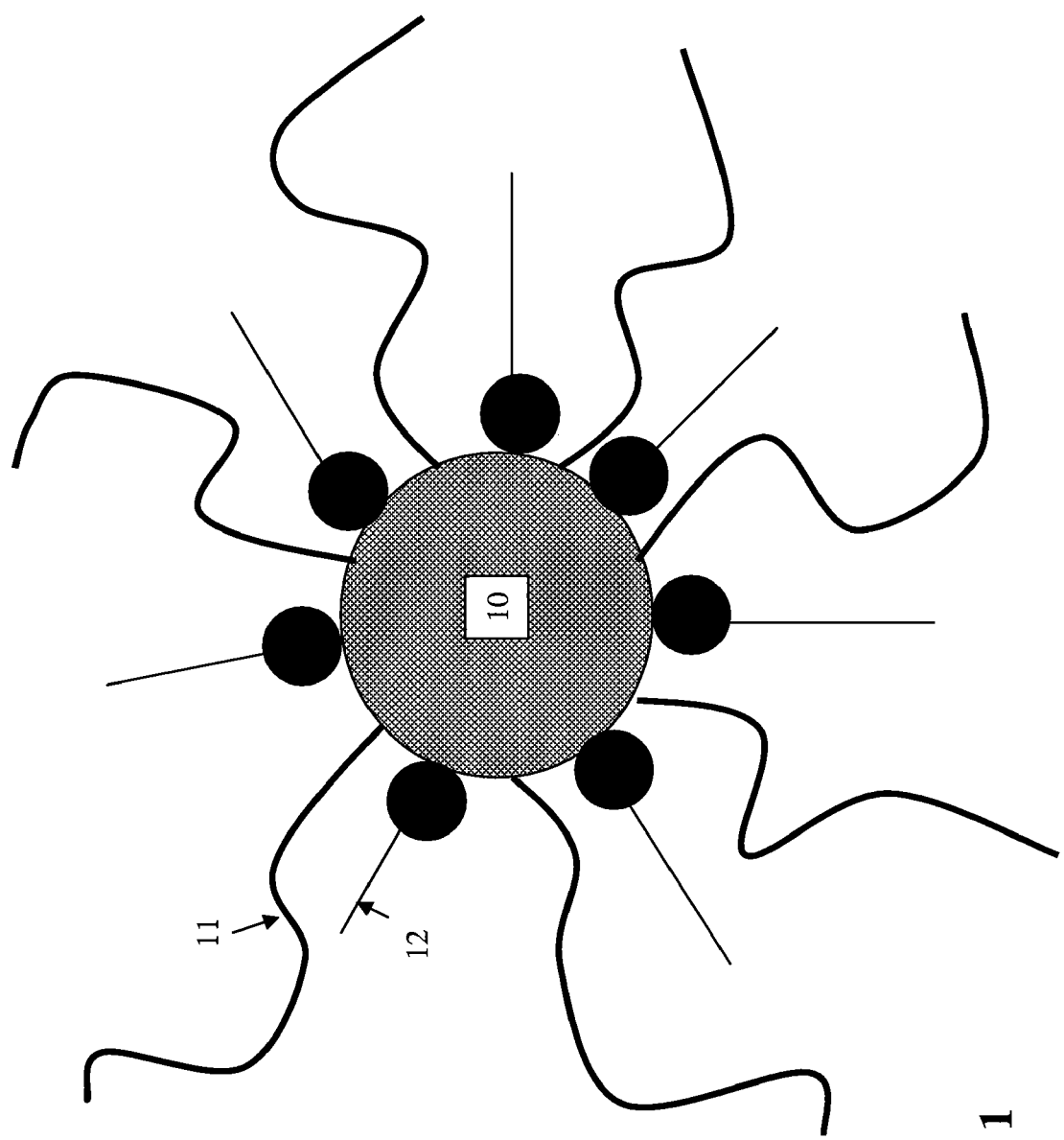
FIGS. 1-7 depict pigment particles of the present invention.

The first aspect of the present invention is directed to pigment particles suitable for an electrophoretic display, which comprise a) long-chain polymer stabilizers attached to the surface of the pigment particles; and b) a charge generating element.

In one embodiment, the charge generating element is a charge controlling agent which is inserted between the long-chain polymer stabilizers and attached directly to the exposed surface of the pigment particles.

In one embodiment, the pigment particles further comprise short-chain molecules with a functional moiety bonded to the surface of the pigment particles; and the charge generating element is a charge controlling agent which interacts with the short-chain molecules.

In one embodiment, the long-chain polymer stabilizer comprises a side chain, and the charge generating element is a charge controlling agent which interacts with the side chains of said long-chain polymer stabilizers.

In one embodiment, the charge generating element is a molecule with a charging group directly coupled to the surface of the pigment particles.

In one embodiment, the long-chain polymer stabilizers are long-chain polymers and the charge generating element is a charge controlling agent with a polar head or a charged functional group inserted into the long-chain polymers.

In one embodiment, the pigment particle is encapsulated within a polymeric network formed from a crosslinking agent which connects the long-chain polymer stabilizers.

In one embodiment, the long-chain polymer stabilizers are long chain polymers, which form a crosslinked polymeric network on the surface of the pigment particles, and the charge generating element is a charge controlling agent diffused in between the long chain polymers, but not in direct contact with the surface of the pigment particles.

In one embodiment, the long-chain polymer stabilizer is an oligomer or polymer with a single chain or a branched chain.

In one embodiment, the surface of the pigment particles is functionalized with a reactive moiety to be coupled with the long chain polymer stabilizer.

In one embodiment, the present invention is directed to a method for generating the long-chain polymer stabilizers, which method comprises surface polymer grafting, surface polymerization, free radical polymerization, reversible addition—fragmentation chain transfer polymerization (RAFT) or atomic transfer radical polymerization (ATRP).

The second aspect of the present invention is directed to an electrophoretic fluid which comprises the pigment particles of the present invention, dispersed in a solvent or solvent mixture.

In one embodiment, the fluid comprises one type of pigment particles dispersed in a solvent or solvent mixture of a contrast color.

In one embodiment, the fluid comprises two types of pigment particles of contrast colors.

The third aspect of the present invention is directed to an electrophoretic display comprising display cells filled with a fluid of the present invention.

In one embodiment, the display cells are microcups.
In one embodiment, the display cells are microcapsules.

DETAILED DESCRIPTION OF THE INVENTION

An electrophoretic display relies on the movement of charged pigment particles under an electric field to display images. The solvent or solvent mixture to disperse the charged pigment particles is usually an organic solvent with a low dielectric constant.

The pigment particles, according to the present invention, are stable in solvent under an electric field, have desired charge and charge density on the particle surface, and do not agglomerate.

One aspect of the present invention is directed to structural designs of pigment particles and methods for their preparation.

In one embodiment, the charge of the pigment particles is generated through the use of a charge generating element, such as a charge controlling agent (CCA), which is absorbed on the particle surface through charge interaction, hydrogen bonding, Van der Waals force, hydrophobic-hydrophobic interaction or the like.

In another embodiment, the charge of the pigment particles is generated through linking a charge generating element, such as a charged functional group, to the particle surface, through chemical bonding.

FIG. 1 illustrates one type of pigment particles of the present invention. In this design, long-chain polymer stabilizers (11) are attached to the surface of the pigment particles (10). There are exposed spaces on the surface of the pigment particles between the long-chain polymer stabilizers. A charge generating element, such as a charge controlling agent (12), therefore can be inserted between the long-chain polymer stabilizers and attached directly to the exposed surface of the pigment particles. The particles prepared by this method can be easily suspended in a solvent due to the presence of the long-chain polymer stabilizers.

The longer-chain polymer stabilizers are desired to create a steric barrier of about 1 nm to about 50 nm, preferably about 5 nm to about 30 nm, and more preferably about 10 nm to about 20 nm, in thickness, on the pigment particle surface.

Suitable long-chain polymer stabilizers can be selected based on the property of the solvent used in an electrophoretic fluid. The stabilizers may be oligomers and/or polymers with a single chain or a branched chain.

The long chain polymer stabilizers may have different configurations, such as coils, stretched chains or irregular tangled chains on the particle surface, depending on compatibility of the polymer to the solvent in which the particles are dispersed and/or the density and length of the polymer chains.

In the context of the present invention, the long-chain polymer stabilizers may also have brush- or fiber-like structures.

On the surface of the pigment particles, there may be only one single type of the long-chain polymer stabilizers or several types of polymer stabilizers of different structures.

Specific polymer stabilizers may include, but are not limited to, polyethylene, polypropylene, polyacrylate, polyurethane, polyester or polysiloxane.

For bistability of an electrophoretic display, polymers that have more side chains or of higher lengths are preferred as stabilizers. Such polymers may form from monomers include, but are not limited to, lauryl acrylate, lauryl methacrylate, 2-ethylhexyl acrylate, 2-ethylhexyl methacrylate, hexyl acrylate, hexyl methacrylate, n-octyl acrylate, n-octyl methacrylate, n-octadecyl acrylate and n-octadecyl methacrylate.

It is noted that the stabilizers described herein are suitable for all embodiments (e.g., FIGS. 1-7) of the present invention. The polymer stabilizers may be cross-linked in the presence of a cross-linking agent to form a polymer network over the surface of the pigment particles.

In general, the presence of the stabilizers on the particle surface as shown in the present invention, is key to achieve a good electrophoretic fluid. Selection of the material for the polymer stabilizers would depend on the compatibility of the material with the solvent used in an electrophoretic fluid. For example, if in a hydrocarbon solvent, a polyester may not stabilize the particles in it, while an acrylate can provide a stable dispersion.

To form the long-chain polymer stabilizers on the particle surface, the particle surface is first functionalized (i.e., pretreated) with reactive moieties to be coupled with the long chain polymer stabilizers.

For example, the hydroxyl terminated long-chain stabilizers may be attached onto the surface of the pigment particles by first coupling the pigment particles with an isocyanate silane (e.g., 3-isocyanotopropyltrimethoxy silane). The isocyanate group on the isocyanate silane is then reacted with the hydroxyl group on the long-chain polymer stabilizers.

Alternatively, the long-chain polymer stabilizers may be isocyanate terminated, such as poly(propylene glycol), tolylene 2,4-diisocyanate terminated (Aldrich 433497). In this case, a silane with an amino group (e.g., N-(2-aminoethyl)-3-aminopropyltrimethoxysilane, 3-aminopropyltrimethoxysilane) is first coupled with the pigment particles and then the amino group will bond with the isocyanate group on the long-chain polymer stabilizers.

Further alternatively, an initiator and/or a polymerizable group may be bonded to the particle surface, followed by polymerizing monomers onto the particle surface to form a chain that is long enough to stabilize the pigment particles in an electrophoretic fluid. For example, silanes with acrylate group (e.g., methacryloxypropyltrimethoxysilane or N-[3-(trimethoxysilyl)propyl]-N'-(4-vinylbenzyl)ethylenediamine hydrochloride) may be coupled to the particle surface, and then different types of acrylate monomers may be polymerized onto the particle surface to form long-chain polymer stabilizers.

It is also possible for acrylate monomers with a polar moiety, such as acrylic acid, to be directly attached to the particle surface and then other monomers can polymerize with the unsaturated bonds on the particle surface.

Another alternative would be directly coupling an initiator to the particle surface to initiate polymerization on the particle surface. For example, 4,4'-azobis(4-cyanovaleic acid) or 2,2'-azobis(2-methlpropionamidine)-dihydrochloride can bond to the particle surface and initiate polymerization. The surface polymerization may be accomplished in a solvent that is suitable for an initiator to generate radicals, such as toluene, tetrahydrofuran, benzene or the like. Such a reaction may be carried out between 60° C. and 90° C. for up to 24 hours.

Copolymers or block copolymers are other options. Monomers that have different structures can be copolymerized to form the polymer stabilizers on the particle surface. For example, styrene and ethylhexyl acrylate can be used together to adjust the flexibility of the chains. Rigidity of the polymer chains may affect the interaction between the pigment particles carrying different charge polarities. But for oppositely charged pigment particles, some rigidity is preferred for better separation.

The charge control agent (CCA) used in all embodiments (e.g., FIGS. 1-7) of the present invention is compatible with the solvent in an electrophoretic fluid and may interact with the particle surface to effectively generate either positive or negative charge for the pigment particles.

Examples of CCA may include, but are not limited to, Solsperse 17000 (active polymeric dispersant), Solsperse 9000 (active polymeric dispersant), OLOA 11000 (succinimide ashless dispersant), Unithox 750 (ethoxylates), Span 85 (sorbitan trioleate), Petronate L (sodium sulfonate), Alcolec LV30 (soy lecithin), Petrostep B100 (petroleum sulfonate) or B70 (barium sulfonate).

Figure 2:
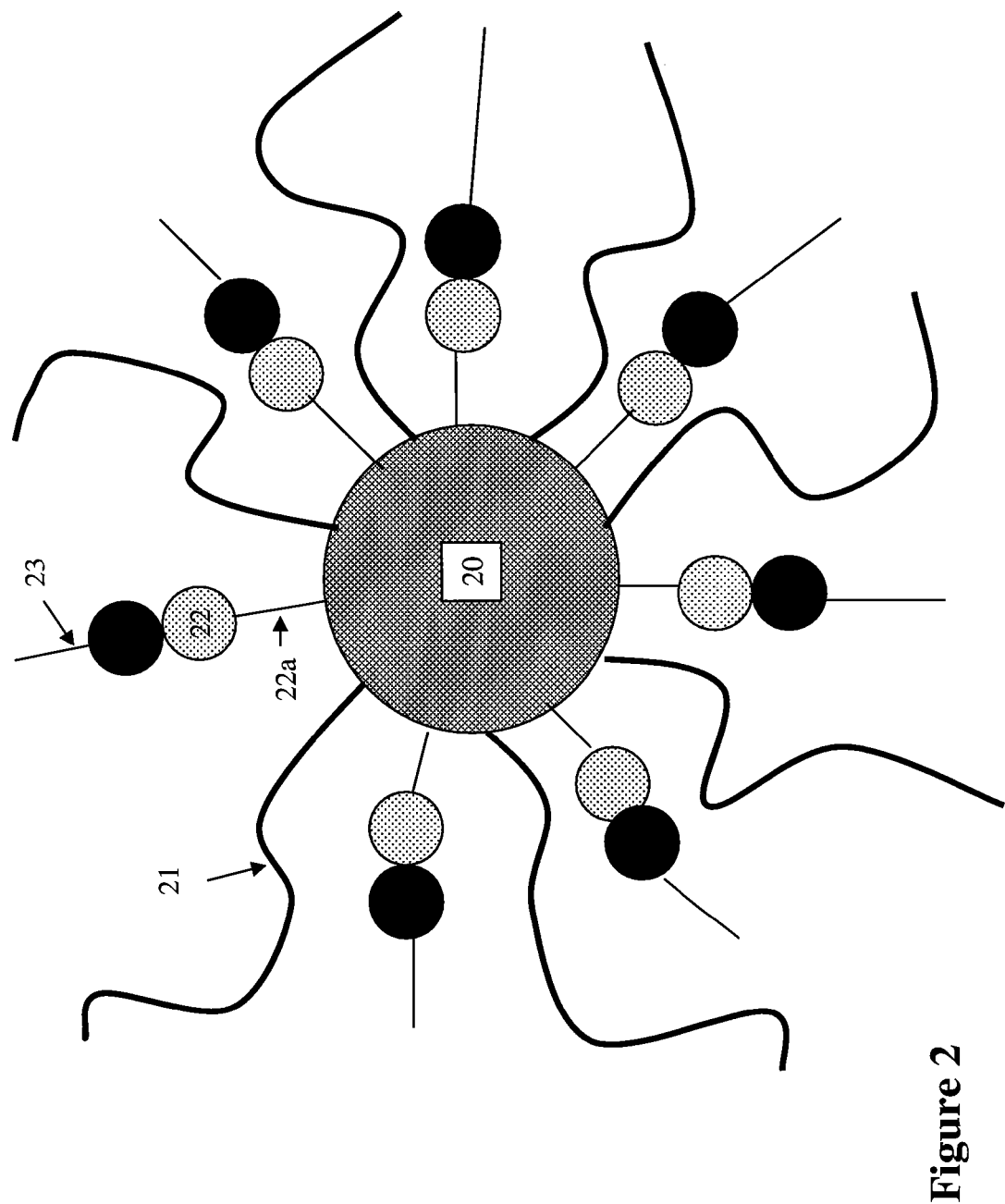

FIG. 2 illustrates another type of pigment particles of the present invention. In the pigment particles as shown, besides the long-chain polymer stabilizer (21) attached to the surface of the pigment particles (20), there are short-chain molecules (22) with a functional moiety (22a), which are also bonded to the surface of the pigment particles. The short chain molecules, in this case, interact with a charge controlling agent (23) which provides charge to the pigment particles. The chain of the short-chain molecules may have a chain length of 1 to 50 carbons, preferably 3 to 30 carbons, and more preferably 3 to 15 carbons. Examples of such short-chain molecules may include, but are not limited to, citric acid, 3-(trihydroxysilyl)propyl methylphosphonate, aminopropyl trimethoxysilane, glycidoxypropyl trimethoxysilane, hydroxymethyltriethoxy-silane, methacryloxypropyltrimethoxysilane, N-[3-(trimethoxysilyl)propyl]-N'-(4-vinylbenzyl)ethylenediamine hydrochloride) or a chlorosilane comprising a polar moiety.

Figure 3:
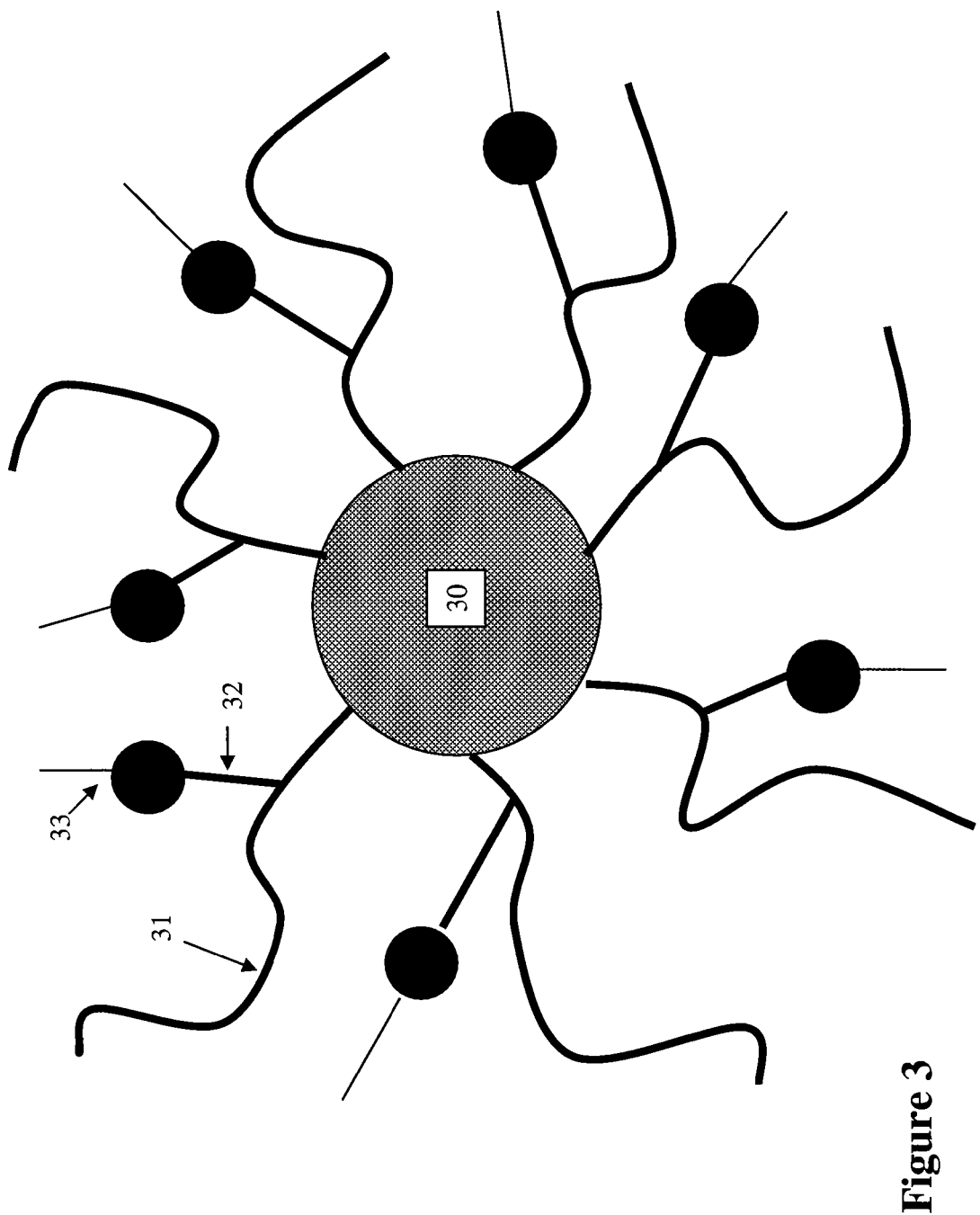

FIG. 3 illustrates a further type of pigment particles of the present invention. In the pigment particles as shown, the long-chain polymer stabilizers (31) attached to the surface of the pigment particles (30) have a side chain (32) which interacts with a charge controlling agent (33), providing charge to the pigment particles. The side chain (32) comprises a polar moiety, such as hydroxyl, carboxyl, amine, amide, thiol, isocyanate, pyrrole or the like. These functionalities are either part of the natural long-chain polymer stabilizers or may be generated through block copolymerization. For example, acrylic acid may be copolymerized with lauryl acrylate on the particle surface and form long-chain polymer stabilizers with a dangling side acid group. Such acrylate monomers with functional group may be vinylpyrolidinone, N-isopropyl acrylamide, 2-(dimethylamino)ethylmethacrylate, 2-hydroxypropyl acrylate, methacrylic acid or the like. The amount of the functional group and the position of the functional group on the long-chain polymer stabilizers may be controlled through polymerization process design and condition control.

Figure 4:
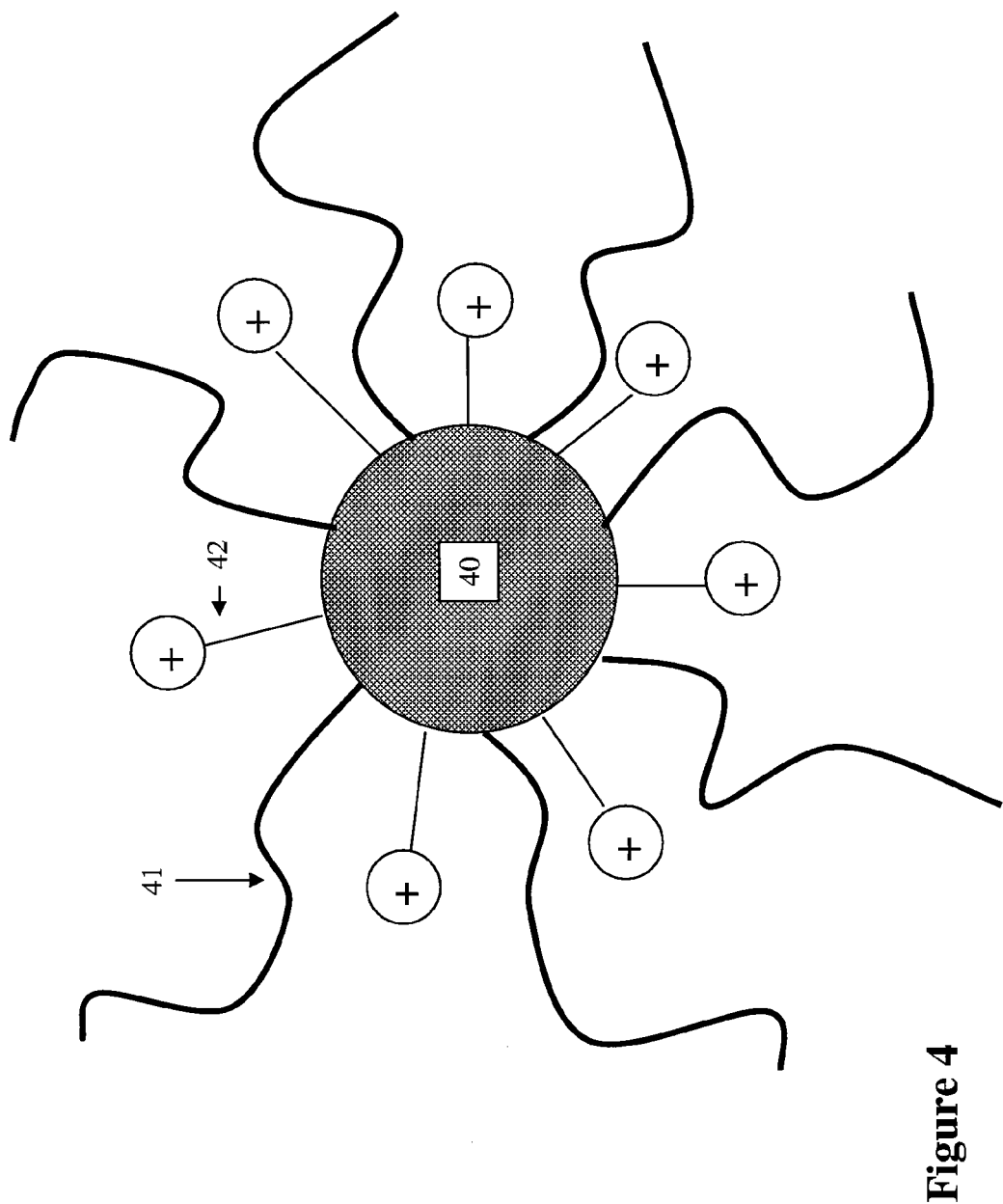

FIG. 4 illustrates yet a further type of pigment particles of the present invention. As shown, there are not only the long-chain polymer stabilizers (41) attached to the surface of the pigment particle (40), but also molecules (42) with a charging group directly coupled to the surface of the pigment particle. In this case, no charge control agent is needed in an electrophoretic fluid. The charge (positive or negative) may be embedded within an organic steric barrier layer formed from the long-chain polymer stabilizers.

The charging group may be quaternary ammonium methyl sulfate, succinimide, sulfonate, sodium petronate, phosphonate or the like.

The advantage of this structure is the stability of the charge property, which in turn is beneficial for continuous driving, lifetime and thermal lifetime of an electrophoretic display.

Figure 5:
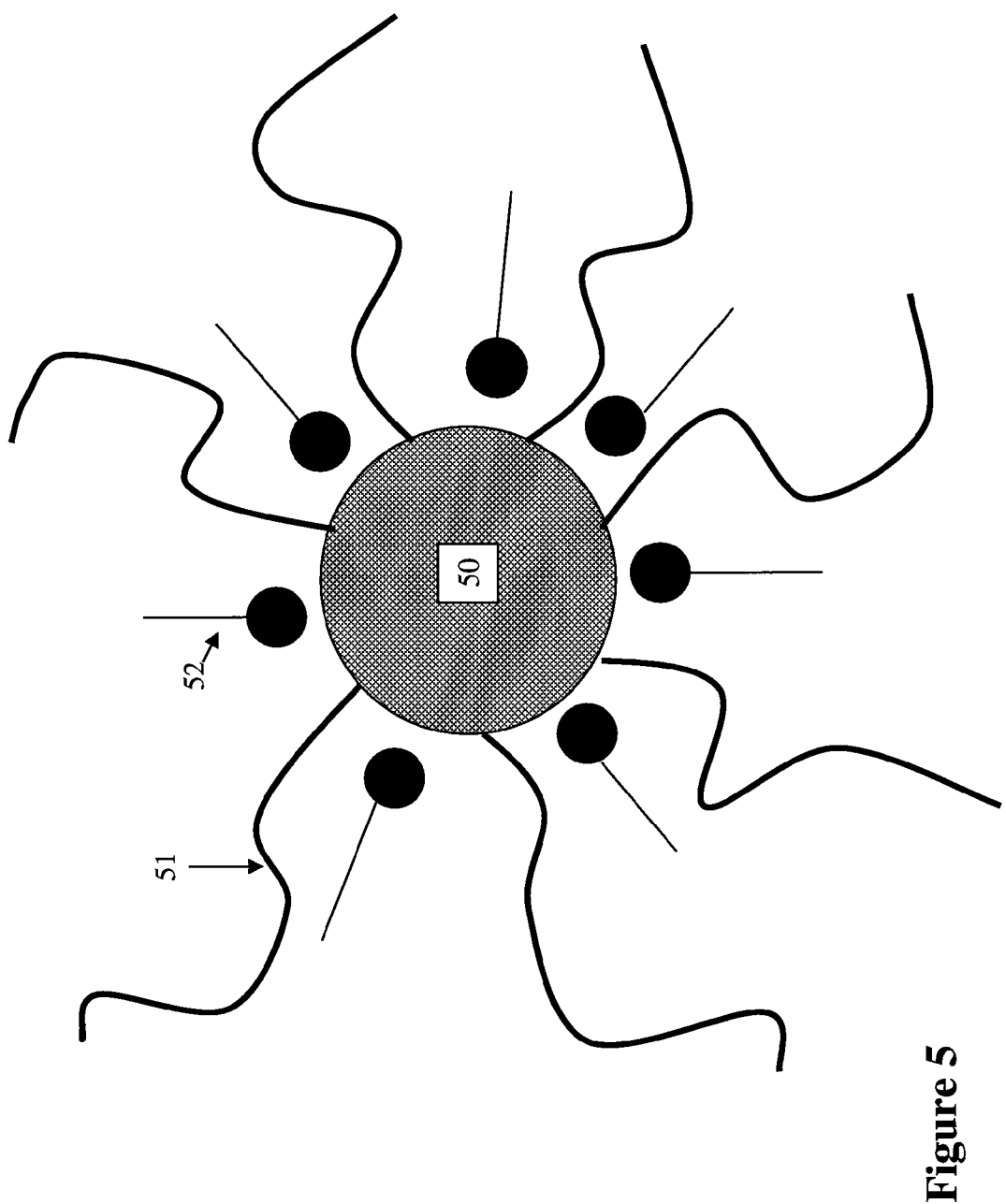

FIG. 5 illustrates pigment particles (50) of the present invention on the surface of which there are long-chain polymer stabilizers (51) stretching out. The density of the long-chain polymer stabilizers could affect the interaction between a charge controlling agent (52) and the particle surface. The polar head or the charged functional group of the charge controlling agent is inserted into the polymer chains, so that the actual charge moiety is close to the pigment surface while the long-chain polymer stabilizers will stretch out to protect the charge inside. In other words, the non-charged long-chain polymer stabilizers act as a protective screen. This is particularly important when an electrophoretic fluid comprises two types of charged pigment particles of contrast colors (e.g., black and white). The protective screen formed from the non-charged long-chain polymer stabilizers may keep the two oppositely charged pigment particles apart. However, if the density of the long-chain polymer stabilizers is too high, it may become difficult for the charge controlling agent to be inserted into the spaces between the long-chain polymer stabilizers. On the other hand, if the density is too low, there would not be enough polymer molecules to stabilize the particles in the fluid.

The pigment particles of FIGS. 1-5 all have charge (positive or negative) generated close to the particle surface or embedded within the polymer stabilizers, but not directly on the surface to avoid particles being sticking together.

Figure 6:
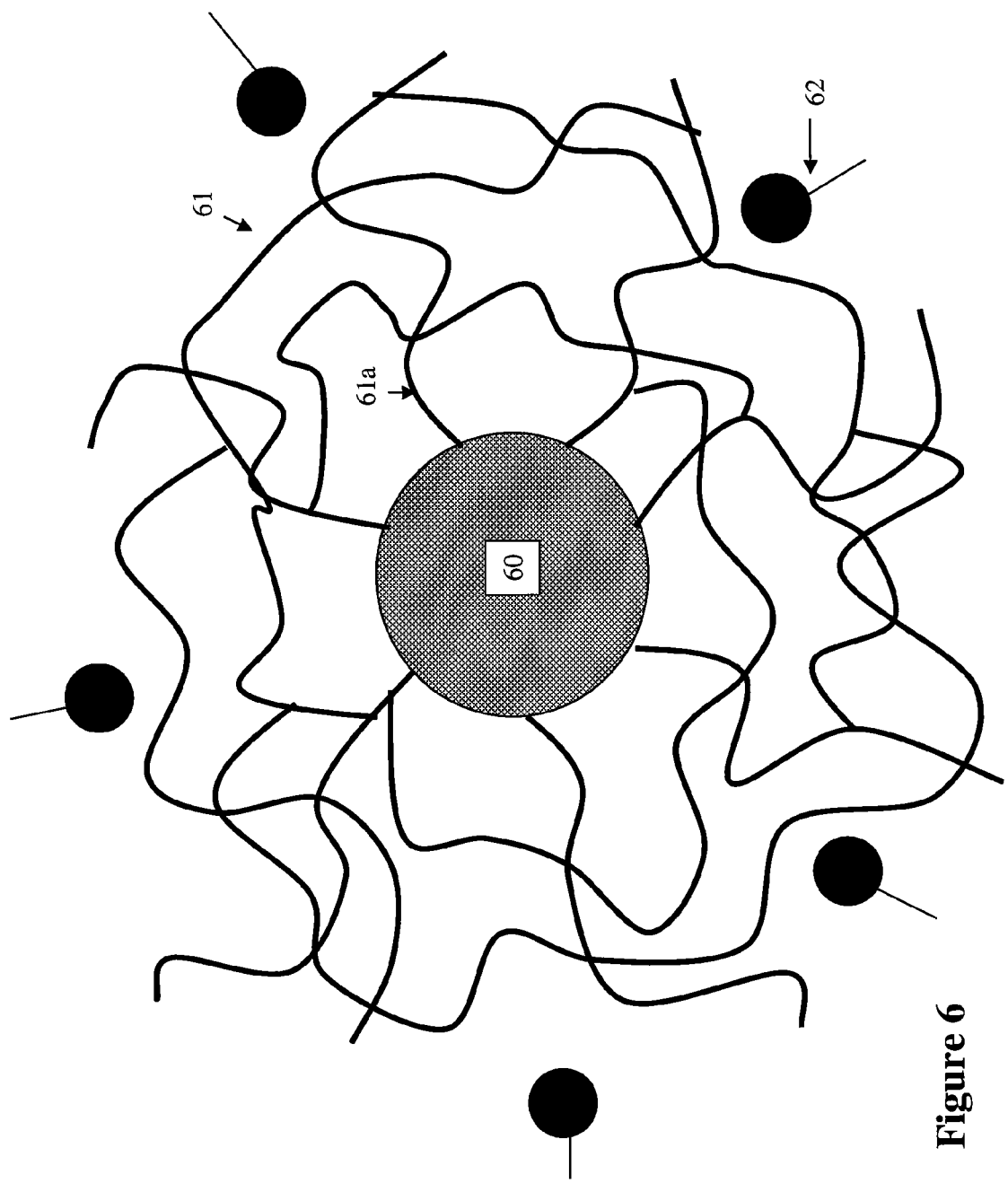

FIG. 6 illustrates another type of pigment particles (60) which are encapsulated within a crosslinked polymeric network (i.e., polymeric shell) (61). A crosslinking agent (e.g., divinyl benzene or ethylene glycol dimethacrylate) may be used to connect long-chain polymer stabilizers (61a) together to form the network on the surface of the pigment particles. This configuration will render the surface more robust and less sticky. The crosslinking density (e.g., about 1 to 20%) of the polymeric network formed may be adjusted through different compositions.

The cross-linked or encapsulated structure as shown in FIG. 6 may also have the additional function of improving the photo lifetime of an electrophoretic display. This advantage is more pronounced when titanium dioxide ($TiO_2$) is used as the white pigment particles. It is known that $TiO_2$ has a photocatalytic effect. More specifically, the charge on the pigment particles and charge balance in the electrophoretic fluid may be affected when $TiO_2$ particles are present in the fluid because $TiO_2$ tends to generate free radicals, thus causing transfer of charge to other components in the fluid under light. The configuration of FIG. 6 may prevent $TiO_2$ particles from direct or close contact with each other or with other components in the fluid, especially the charge controlling agent (62), thus minimizing the photo-catalytic effect.

Figure 7:
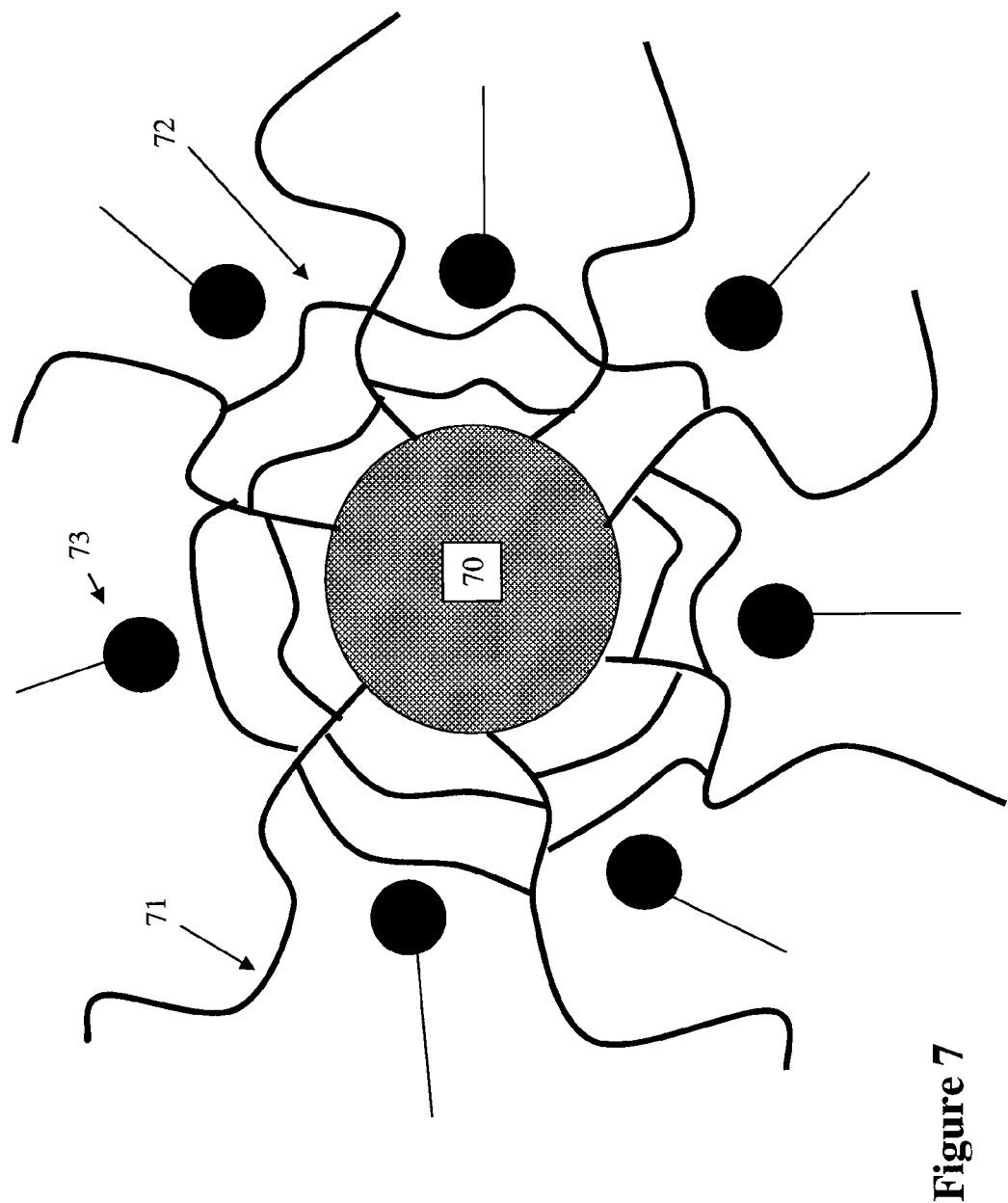

FIG. 7 illustrates a further type of pigment particles of the present invention which have both the long chains (71) and a cross-linked polymeric network (72) on the surface of the pigment particles (70). In this type of pigment particles, the crosslinked polymeric network is close to the pigment particles, while the long chains are longer and therefore would appear to penetrate through the polymeric network. In this configuration, the charge controlling agent (73) can be diffused in between the long chains, but can not have direct contact with the surface of the pigment particles.

The polymer content or the thickness of the polymer layer on the surface of the pigment particles from the long-chain polymer stabilizers not cross-linked or from the cross-linked polymeric network may also have a significant impact on the display performance. First of all, particles of larger sizes and higher specific gravity would, require more polymer content to stabilize in the liquid medium for density matching. Secondly, if the pigment particles have more charge on the surface, then a thicker polymer coating is preferred in order to separate the particles carrying opposite charges. It is therefore important to maintain a balance between the charge carried by the particles and the polymer coating thickness.

The polymer coating formed from the stabilizers (cross-linked or non-cross-linked) can be prepared through various techniques. Some of them are described above. For example, long-chain polymer stabilizers can be directly grafted to pigment surface through chemical bonding. In another embodiment, traditional free radical polymerization on particle surface with, such as acrylate monomers, may be used. In another embodiment, the living radical polymerization technique may be preferred in order to better control the surface density of polymer stabilizers, chain length of polymer stabilizers and composition and length of block copolymer chains. Living radical polymerization include techniques such as atomic transfer radical polymerization (ATRP) or reversible addition—fragmentation chain transfer polymerization (RAFT).

Another aspect of the present invention is directed to an electrophoretic fluid comprising pigment particles as described above dispersed in a solvent or solvent mixture. The fluid may comprise only one type of pigment particles or two types of pigment particles of contrast colors and carrying opposite charge polarities.

The pigment used in the present invention may be inorganic pigments, such as $TiO_2$, $ZrO_2$, ZnO, $Al_2O_3$, CI pigment black 26 or 28 or the like (e.g., manganese ferrite black spinel or copper chromite black spinel). They also can be organic pigment such as phthalocyanine blue, phthalocyanine green, diarylide yellow, diarylide AAOT yellow, and quinacridone, azo, rhodamine, perylene pigment series from Sun Chemical, Hansa yellow G particles from Kanto Chemical, and Carbon Lampblack from Fisher.

The solvent or solvent mixture in which the pigment particles are dispersed preferably has a low viscosity and a dielectric constant in the range of about 2 to about 30, preferably about 2 to about 15 for high particle mobility. Examples of suitable dielectric solvent include hydrocarbons such as ISOPAR® (a fluid hydrocarbon solvent of petroleum origin), decahydronaphthalene (DECALIN®), 5-ethylidene-2-norbornene, fatty oils, paraffin oil; silicon fluids; aromatic hydrocarbons such as toluene, xylene, phenylxylylethane, dodecylbenzene and alkylnaphthalene; halogenated solvents such as perfluorodecalin, perfluorotoluene, perfluoroxylene, dichlorobenzotrifluoride, 3,4,5-trichlorobenzotri fluoride, chloropentafluoro-benzene, dichlorononane, pentachlorobenzene; and perfluorinated solvents such as FC-43, FC-70 and FC-5060 from 3M Company, St. Paul Minn., low molecular weight halogen containing polymers such as poly (perfluoropropylene oxide) from TCI America, Portland, Oreg., poly(chlorotrifluoro-ethylene) such as Halocarbon Oils from Halocarbon Product Corp., River Edge, N.J., perfluoropolyalkylether such as GALDEN® from Ausimont or KRYTOX® Oils and Greases K-Fluid Series from DuPont, Delaware, polydimethylsiloxane based silicone oil from Dow-corning (DC-200). The solvent or solvent mixture may be colored by a dye or pigment.

In an electrophoretic fluid comprising two types of pigment particles carrying opposite charge polarities and are of contrast colors, the particles preferably have a polymer layer on their surface as described above to prevent them from sticking to each other. Otherwise, in the case of a black/white display device, the reflectance at the white and black states will suffer. The long-chain polymer stabilizers would serve this purpose.

Furthermore, the polymer stabilizers on the two types of charged pigment particles are preferably different and not compatible. For example, for white pigment particles, lauryl acrylate may be used as the long-chain polymer stabilizers on the surface and for black pigment particles, ethylhexyl methacrylate may be used as the long-chain polymer stabilizers with crosslinking.

A further aspect of the invention is directed to an electrophoretic display wherein the display cells are filled with an electrophoretic fluid as described above. The term "display cell" is intended to refer to a micro-container which is individually filled with a display fluid. Examples of "display cell" include, but are not limited to, microcups, microcapsules, micro-channels, other partition-typed display cells and equivalents thereof.

EXAMPLES

Example 1

Preparation of White Pigment Particles

A. Surface Pre-Treatment on Pigment Particles

To a 1 L reactor, TiO2 (DuPont Ti-pure R-931, 40 g) isopropanol (IPA, 350 g), deionized water (10 g) and γ-methacryloxypropyltrimethoxysilane (Z-6030 by Dow Corning, 12 g) were added. The reactor was heated to 65° C. with mechanical stirring in a sonication bath. After 2 hours, the mixture was centrifuged at 6000 rpm for 10 minutes. The solids were redispersed in IPA, centrifuged, and dried at 50° C. under vacuum overnight to produce the desired product.

B. Formation of Long Chain Polymer Stabilizers

To a 250 mL flask, the surface treated particles (20 g) prepared in Step A and toluene (80 g) were added and sonicated for 30 minutes, followed by the addition of ethylhexylmethacrylate (40 g) and azobisisobutyronitrile (AIBN, 25 mg). The flask was purged with nitrogen for 20 minutes and then heated to 70° C. After 12 hours, the polymer coated-particles were recovered by centrifugation at 6000 rpm for 10 minutes. The solids were dried at 50° C. under vacuum to produce the final product.

Example 2

Preparation of Pigment Particles with Negatively Charged Functionality

A. Surface Pre-Treatment of Pigment Particles

To a 250 mL flask, Black 444 (Shepherd, 10 g), isopropyl alcohol (IPA) (100 mL) and deionized water (3 g) were added and sonicated for 30 minutes, followed by the addition of γ-methacryloxypropyltrimethoxysilane (Z-6030 by Dow Corning, 10 g). The reactor was heated to 70° C. with magnetic stirring. After 24 hours, the mixture was centrifuged at 6000 rpm for 10 minutes. The solids were re-dispersed in IPA (100 mL), centrifuged and dried at 50° C. under vacuum overnight to produce the desired product.

B. Adding Negative Charge

To a 250 mL flask, the particles (5 g) prepared from Step A above, isopropyl alcohol (IPA, 50 mL) and acrylic acid (1 g) were added and sonicated for 5 minutes. The flask was heated to 70° C. with magnetic stirring. After 6 hours, the mixture was centrifuged at 6000 rpm for 10 minutes. The solids were re-dispersed in IPA (50 mL), centrifuged and dried at 50° C. under vacuum overnight to produce the desired product.

C. Formation of Long Chain Polymer Stabilizers

To a 250 mL flask, the particles (2 g) prepared from Step B above and 25 g of toluene were added and sonicated for 30 minutes, followed by the addition of lauryl acrylate (10 g) and azobisisobutyronitrile (AIBN, 25 mg). The flask was purged with nitrogen for 20 minutes and then heated to 80° C. After 19 hours, the polymer coated-particles were recovered by centrifugation at 6000 rpm for 10 minutes. The solids were dried at 50° C. under vacuum to produce the final product.

Example 3

White Pigment with Cross-linked Polymer Coating

A. Surface Pre-Treatment of $TiO_2$ Particles

To a 1 L reactor, $TiO_2$ (Dupont R-931, 40 g), IPA (320 g), DI water (10 g) and N-[3-(trimethoxysilyl)propyl]-N'-(4-vinylbenzyl)ethylenediamine hydrochloride) (Z-6032, Dow Corning, 12 g) were added. The reactor was heated to 65° C. with mechanical stirring in a sonication bath. After 5 hours, the mixture was centrifuged at 6000 rpm for 10 minutes. The solids were redispersed in IPA (300 g), centrifuged and dried at 50° C. under vacuum overnight to produce the desired product.

B. Formation of Cross-linked Polymeric Network on Pigment Particles

To a 250 mL flask, the particles (40 g) prepared from Step A and 160 g of toluene were added and sonicated for 30 minutes, followed by the addition of lauryl methacrylate (40 g), divinyl benzene (10 g) and AIBN (0.5 g). The flask was purged with nitrogen for 20 minutes and then heated to 70° C. After 12 hours, the polymer coated-particles were recovered by centrifugation at 6000 rpm for 10 minutes. The solids produced were redispersed in toluene and centrifuged. The solids were dried at room temperature under vacuum to produce the final product.

Example 4

Black Pigment with Positive Charge Functionality

A. Silane Reaction on Pigment Particles

Black 444 (Shepherd) 50 g was mixed with 400 g of IPA and 12 g of water. Then 15 g of Z6030 (Dow Corning) was added into the mixture. The container was put in an ultrasonic bath at temperature 65° C. The mixture was also stirred with mechanical stirrer for 2 hours. Then 15 g of aminopropyltrimethoxysilane was added into the dispersion and continue sonication for 2 hours. After reaction, the solids were separated from the liquid through centrifugation and dried in a vacuum oven.

B. Preparation of Polymer Layer on Pigment Particles

To a reaction flask, the particles (50 g) prepared from Step A and 200 g of toluene were added and sonicated for 30 minutes, followed by the addition of lauryl acrylate (60 g) and AIBN (0.6 g). The flask was purged with nitrogen for 20 minutes and then heated to 80° C. After 12 hours, the polymer coated-particles were recovered by centrifugation at 6000 rpm for 10 minutes. The solids produced were redispersed in toluene and centrifuged. The solids were dried at room temperature under vacuum to produce the final product.

Example 5

Grafting of Polymer (Long Chain Polymer Stabilizer) to White Pigment Surface $TiO_2$ powder (40 g) was mixed with 200 g of MEK (methylethylketone) and 10 ml of 3-isocyanatopropyltrimethoxysilane. The mixture was in a sealed flask and put in an ultrasonic bath at temperature 50° C. for 3 hours. After reaction, the solids were separated from the liquid through centrifugation and dried in a vacuum oven.

The above product (10 g) was dispersed in 50 g of toluene. Poly(1,4-butylene adipate) (10 g, Sigma Aldrich) was added into the dispersion, followed by the addition of catalyst tin dilaurate (0.1 g). The reactor was put in an ultrasonic bath at temperature 55° C. for 3 hours. After reaction, the solids were separated from the liquid through centrifugation and dried in a vacuum oven.

Example 6

Electrophoretic Fluid and Optical Performance

The electrophoretic fluid containing 30 wt. % white particles in Example 1, 5 wt. % black particles in Example 4 and 1 wt. % charge control agent SOLSPERSE® (a dispersing agent) 17000 was sealed in microcups and laminated on a backplane. The film was driven with 15 volts and showed a white reflectance of 40% and a contrast ratio of 13.

While the present invention has been described with reference to the specific embodiments thereof, it should be understood by those skilled in the art that various changes may be made and equivalents may be substituted without departing from the true spirit and scope of the invention. In addition, many modifications may be made to adapt a particular situation, materials, compositions, processes, process step or steps, to the objective, spirit and scope of the present invention. All such modifications are intended to be within the scope of the claims appended hereto.

What is claimed is:

1. A pigment particle suitable for an electrophoretic display, comprising:
   a) long-chain polymer stabilizers attached to the surface of the pigment particle; and
   b) a charge generating element, wherein the charge generating element is a charge controlling agent which is inserted between the long-chain polymer stabilizers and attached directly to the exposed surface of the pigment particle.

2. The pigment particle of claim 1, wherein said long-chain polymer stabilizer is an oligomer or polymer with a single chain or a branched chain.

3. The pigment particle of claim 1, wherein the surface of the pigment particle is functionalized with a reactive moiety to be coupled with the long chain polymer stabilizer.

4. The pigment particle of claim 1, wherein said pigment particle is $TiO_2$ particle.

5. A method for generating the long-chain polymer stabilizers of claim 1, which method comprises surface polymer grafting, surface polymerization, free radical polymerization, reversible addition—fragmentation chain transfer polymerization (RAFT) or atomic transfer radical polymerization (ATRP).

6. An electrophoretic fluid comprising the pigment particles of claim 1 dispersed in a solvent or solvent mixture.

7. The electrophoretic fluid of claim 6, wherein the pigment particles are of the same color and carry either negative or positive charge polarity, the pigment particles are dispersed in a solvent or solvent mixture of a contrast color.

8. The electrophoretic fluid of claim 6, wherein the pigment particles are of two contrast colors and carry opposite charges.

9. An electrophoretic display comprising display cells filled with the electrophoretic fluid of claim 6.

10. The electrophoretic display of claim 9, wherein the display cells are microcups.

11. The electrophoretic display of claim 9, wherein the display cells are microcapsules.

12. A pigment particle suitable for an electrophoretic display, comprising:
    a) long-chain polymer stabilizers attached to the surface of the pigment particle;
    b) a charge generating element; and
    c) short-chain molecules with a functional moiety bonded to the surface of the pigment particle, and the charge generating element is a charge controlling agent which interacts with the short-chain molecules.

13. The pigment particles particle of claim 12, wherein the short-chain molecule is citric acid, 3-(trihydroxysilyl)propyl methylphosphonate, aminopropyl trimethoxysilane, glycidoxypropyl trimethoxysilane, hydroxymethyltriethoxysilane, methacryloxypropyltrimethoxysilane, N-[3-(trimethoxysilyl)propyl]-N'-(4-vinylbenzyl)ethylenediamine hydrochloride) or a chlorosilane comprising a polar moiety.

14. The pigment particle of claim 12, wherein said long-chain polymer stabilizer is an oligomer or polymer with a single chain or a branched chain.

15. The pigment particle of claim 12, wherein the surface of the pigment particle is functionalized with a reactive moiety to be coupled with the long chain polymer stabilizer.

16. An electrophoretic display comprising display cells filled with an electrophoretic fluid comprising the pigment particles of claim 12 dispersed in a solvent or solvent mixture.

17. A pigment particle suitable for an electrophoretic display, comprising:
   a) long-chain polymer stabilizers attached to the surface of the pigment particle; and
   b) a charge generating element, wherein said long-chain polymer stabilizer comprises a side chain, and the charge generating element is a charge controlling agent which interacts with the side chains of said long-chain polymer stabilizers.

18. The pigment particle of claim 17, wherein said long-chain polymer stabilizer is an oligomer or polymer with a single chain or a branched chain.

19. The pigment particle of claim 17, wherein the surface of the pigment particle is functionalized with a reactive moiety to be coupled with the long chain polymer stabilizer.

20. An electrophoretic display comprising display cells filled with an electrophoretic fluid comprising the pigment particles of claim 17 dispersed in a solvent or solvent mixture.

21. The pigment particle of claim 17, wherein the side chain comprises a polar moiety.

22. The pigment particle of claim 21, wherein the polar moiety is hydroxyl, carboxylic acid, amine, amide, thiol, isocyanate or pyrrole.

23. A pigment particle suitable for an electrophoretic display, comprising:
   a) long-chain polymer stabilizers attached to the surface of the pigment particle; and
   b) a charge generating element, wherein the charge generating element is a molecule with a charging group directly coupled to the surface of the pigment particle.

24. The pigment particle of claim 23, wherein the charging group is quaternary ammonium methyl sulfate, succinimide, sulfonate or sodium petronate, carboxylic acid, phosphonic acid or phosphonate.

25. The pigment particle of claim 23, wherein said long-chain polymer stabilizer is an oligomer or polymer with a single chain or a branched chain.

26. The pigment particle of claim 23, wherein the surface of the pigment particle is functionalized with a reactive moiety to be coupled with the long chain polymer stabilizer.

27. An electrophoretic display comprising display cells filled with an electrophoretic fluid comprising the pigment particles of claim 23 dispersed in a solvent or solvent mixture.

28. A pigment particle suitable for an electrophoretic display comprising:
   a) long-chain polymer stabilizers attached to the surface of the pigment particle; and
   b) a charge generating element, wherein said long-chain polymer stabilizers are long-chain polymers and the charge generating element is a charge controlling agent with a polar head or a charged functional group inserted into the long-chain polymers.

29. The pigment particle of claim 28, wherein said long-chain polymer stabilizer is an oligomer or polymer with a single chain or a branched chain.

30. The pigment particle of claim 28, wherein the surface of the pigment particle is functionalized with a reactive moiety to be coupled with the long chain polymer stabilizer.

31. An electrophoretic display comprising display cells filled with an electrophoretic fluid comprising the pigment particles of claim 28 dispersed in a solvent or solvent mixture.

* * * * *